(No Model.)
J. L. BOGERT.
LUBRICATING LOOSE PULLEYS.
No. 370,527. Patented Sept. 27, 1887.
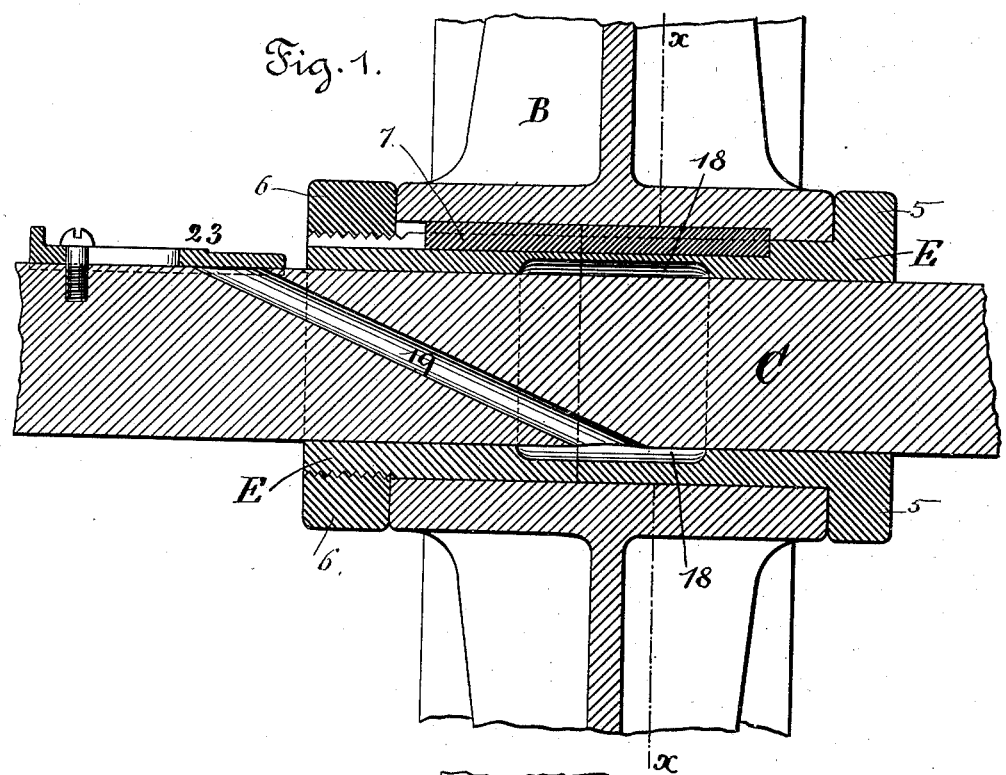
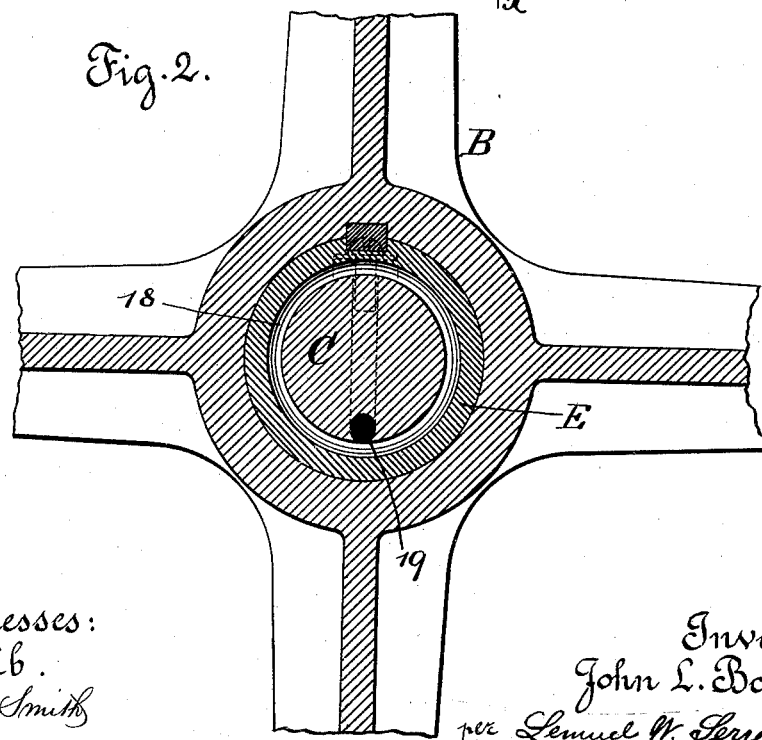
Witnesses:
J. Staib.
Chas. H. Smith
Inventor:
John L. Bogert
per Lemuel W. Serrell
atty.

UNITED STATES PATENT OFFICE.

JOHN L. BOGERT, OF FLUSHING, NEW YORK.

LUBRICATING LOOSE PULLEYS.

SPECIFICATION forming part of Letters Patent No. 370,527, dated September 27, 1887.

Application filed December 27, 1886. Serial No. 222,541. (No model.)

*To all whom it may concern:*

Be it known that I, JOHN L. BOGERT, of Flushing, in the county of Queens and State of New York, have invented an Improvement in Means for Lubricating Rotative Shafts and Devices Revolving Thereon, of which the following is a specification.

Great difficulty has heretofore been experienced in lubricating loose pulleys and similar articles, because the centrifugal action throws the oil away from the shaft and the parts become heated. In instances where an oil-cup is put upon the loose pulley the oil runs away from the bearing when the cup hangs downwardly, and in many instances the speed is such that the oil is kept away from the bearing in the top of the cup. My present invention is made for overcoming these difficulties, and it is especially available for oiling the counter-shafts in lathes; but it may be availed of with any loose pulley or other device revolving upon a rotative shaft.

In the drawings, Figure 1 is a section representing my improved lubricator and part of the hub of a loose pulley or wheel with which it is used. Fig. 2 is a cross-section of the same at the line *x x*, Fig. 1.

The rotative shaft C is of any desired size, and around it is the loose pulley B, or other revolving device. If desired, a bush, E, may be introduced within the hub of the pulley B; but usually there will not be any bush. The bushing E is shown as having a flange, 5, around one end and threaded, with a nut, 6, at the other end to secure the parts in place, and with a longitudinal key, 7, to insure the rotation of the bush and pulley. In this bush or hub is an annular recess or cavity, 18, which is preferably midway between the ends of the hub, and it is of any desired width and depth, and there is a diagonal hole, 19, passing across through the shaft C, one end of which hole is adjacent to the cavity or recess 18, and the other end is at the opposite side of the shaft and beyond the end of the hub or bush, and it is preferable to employ a cover or cap, 23, which may be attached in any desired manner at this outer end of this diagonal hole. I have shown such cap as held by a screw passing through a slot in the cap, so that it can be slid over the hole. It will now be understood that the oil is poured into the upper end of the diagonal hole when the shaft has been stopped in the proper position, and the oil passes into the recess or cavity 18, and more or less lubricating material can be inserted, according to the size of this cavity. There is nothing to cause the oil to run away or waste, because the centrifugal action, when the pulley or the pulley and the shaft are revolving, tends to project the oil upon the bottom of the cavity all around such annular cavity, and it cannot escape, because there is no opening out of this cavity, and the lubricating material will remain therein and only work out therefrom gradually as it lubricates the interior surface of the hub or bush and the exterior surface of the shaft, and when the parts are at rest the oil will subside into the lower part of the cavity and cannot pass out through the hole 19, because that diagonal hole is above the place into which the oil subsides. For these reasons the lubricating material is always in the proper position, and little or no more oil is required for a loose pulley than for any other bearing of the same size.

In cases where a stationary axle has been provided with an oil-cup and a diagonal hole passing down inside of the hub or axle-box the parts are not adapted to a loose pulley on a shaft that revolves, because the oil will be thrown out into the oil-cup by the revolution of the shaft, and there remain, and numerous oil-cups on the revolving shaft do not lessen the difficulty.

By my improvement the oil can be supplied to the loose pulley while such pulley is running and the shaft standing still, and when both shaft and loose pulley are revolving the oil is kept in the cavity of the loose pulley directly adjacent to the surfaces to be lubricated when the shaft is stopped and the pulley is revolved thereon, and the cover to the diagonal hole prevents dust and dirt being drawn into the hole by the centrifugal action.

I claim as my invention—

1. A loose pulley having an annular recess around the interior of its hub, in combination with the rotative shaft supporting the loose pulley, said shaft having a diagonal lubricating-hole passing in outside the hub and leading to the annular recess, whereby the loose pulley can be lubricated without stopping its rotation, and the rotation of the shaft does not throw the oil out by centrifugal force, substantially as specified.

2. The combination, with a pulley or other revolving device having an annular recess around the interior surface, of a rotative shaft for supporting the same, said shaft having therein a lubricating-channel formed by a diagonal hole passing in outside the hub of the revolving pulley and leading to the annular recess, and a cap attached to the shaft for covering the outer end of the hole, substantially as set forth.

Signed by me this 23d day of December, A. D. 1886.

JOHN L. BOGERT.

Witnesses:
GEO. T. PINCKNEY,
WILLIAM G. MOTT.